(12) United States Patent
Zimmerman et al.

(10) Patent No.: US 10,493,545 B2
(45) Date of Patent: *Dec. 3, 2019

(54) REAMER

(71) Applicant: Kennametal Inc., Latrobe, PA (US)

(72) Inventors: Armin Josef Zimmerman, Nabburg (DE); Robert Meyer, Allersberg (DE); Michael Schuffenhauer, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,824

(22) Filed: Oct. 9, 2017

(65) Prior Publication Data

US 2018/0029150 A1 Feb. 1, 2018

Related U.S. Application Data

(63) Continuation of application No. 14/435,495, filed as application No. PCT/US2013/062209 on Sep. 27, 2013, now Pat. No. 9,802,260.

(30) Foreign Application Priority Data

Oct. 15, 2012 (DE) .................. 10 2012 020 185

(51) Int. Cl.
  *B23D 77/00* (2006.01)
  *B23D 77/02* (2006.01)

(52) U.S. Cl.
  CPC .......... *B23D 77/02* (2013.01); *B23D 2277/02* (2013.01); *B23D 2277/06* (2013.01); *B23D 2277/061* (2013.01); *B23D 2277/30* (2013.01); *B23D 2277/60* (2013.01); *Y10T 408/455* (2015.01); *Y10T 408/78* (2015.01)

(58) Field of Classification Search
  CPC ............... B23D 77/00; B23D 2277/02; B23D 2277/061; B23B 2240/08; B23B 2240/11; B23B 2240/16; Y10T 408/909; Y10T 408/9095; Y10T 408/9097; Y10T 408/78
  See application file for complete search history.

(56) References Cited

U.S. PATENT DOCUMENTS

| | | |
|---|---|---|
| 1,977,845 A | 10/1934 | Emmons |
| 3,055,239 A | 9/1962 | Andreasson |
| 3,080,777 A | 3/1963 | Lovret |
| 3,216,107 A | 11/1965 | Andreasson |
| 3,307,243 A | 3/1967 | Andreasson |

(Continued)

FOREIGN PATENT DOCUMENTS

| | | |
|---|---|---|
| CH | 433916 | 4/1967 |
| CN | 200995296 | 12/2007 |

(Continued)

OTHER PUBLICATIONS

May 3, 2017 Final Office Action (U.S. Appl. No. 14/435,495).

(Continued)

*Primary Examiner* — Alan Snyder
(74) *Attorney, Agent, or Firm* — Ian K. Samways

(57) ABSTRACT

A reamer has a shank made of steel and a cutting body made of a harder material, wherein the cutting body forms the outer circumference of the reamer in the region of the workpiece side end and has all the cutting ribs.

22 Claims, 1 Drawing Sheet

(56) References Cited

U.S. PATENT DOCUMENTS

| | | | |
|---|---|---|---|
| 3,359,837 A | 12/1967 | Andreasson | |
| 3,368,257 A | 2/1968 | Andreasson | |
| 3,370,489 A * | 2/1968 | Andreasson | B23D 77/006 407/11 |
| 3,543,613 A | 12/1970 | Obloy | |
| 3,548,688 A | 12/1970 | Kuch | |
| 3,591,302 A | 7/1971 | Andreasson | |
| 3,912,414 A | 10/1975 | Fukura | |
| 4,166,711 A | 9/1979 | Kress | |
| 4,383,784 A | 5/1983 | Gulbrandsen | |
| 5,580,196 A | 12/1996 | Thompson | |
| 6,183,173 B1 * | 2/2001 | Ritter | B23B 51/0486 408/229 |
| 6,494,648 B2 | 12/2002 | Harpaz | |
| 6,499,919 B2 | 12/2002 | Feld | |
| 6,896,450 B2 | 5/2005 | Rothenstein | |
| 9,802,260 B2 * | 10/2017 | Zimmerman | B23D 77/02 |
| 2005/0271890 A1 | 12/2005 | Koecher | |
| 2007/0237593 A1 * | 10/2007 | Nomura | B23D 77/02 408/227 |
| 2008/0206001 A1 | 8/2008 | Bozkurt | |
| 2009/0123244 A1 | 5/2009 | Buettiker | |

FOREIGN PATENT DOCUMENTS

| | | | |
|---|---|---|---|
| CN | 101300100 A | 11/2008 | |
| CN | 201833031 | 5/2011 | |
| CN | 202447724 | 9/2012 | |
| DE | 2246965 A1 | 4/1974 | |
| DE | 10102697 | 7/2002 | |
| DE | 20300520 | 5/2004 | |
| DE | 69930340 | 10/2006 | |
| DE | 102010036869 | 2/2012 | |
| FR | 2020138 A1 * | 7/1970 | B23B 27/007 |
| GB | 705784 | 3/1954 | |
| GB | 1233953 A * | 6/1971 | B23B 27/007 |
| GB | 1360221 A | 7/1974 | |
| JP | 2012176486 | 9/2012 | |
| NL | 1004625 | 5/1998 | |
| WO | WO2007052250 A2 | 5/2007 | |
| WO | WO2014062363 | 4/2014 | |

OTHER PUBLICATIONS

Jun. 21, 2013 Third Office Action (DE App. No. 102012020185.0).
May 20, 2015 International Preliminary Report (PCT App. No. PCT/US2013/062209).
May 11, 2016 First Office Action (CN App. No. 201380053534.4).
Oct. 6, 2016 Office action (3 months) (U.S. Appl. No. 14/435,495).
Dec. 26, 2016 Second Office Action (CN App. No. 201380053534.4).
Jun. 5, 2017 Third Office Action (CN App. No. 201380053534.4).
Dec. 13, 2018 Foreign OA.

* cited by examiner

REAMER

CROSS-REFERENCE TO RELATED APPLICATIONS

This application under 35 USC § 120 is a continuation of co-pending U.S. patent application Ser. No. 14/435,495, filed on Apr. 14, 2015, which is incorporated herein by reference in its entirety and is a National Stage Entry of International Application No. PCT/US2013/062209, filed on Sep. 27, 2013, itself incorporated herein by reference in its entirety and claiming priority to Federal Republic of Germany Patent Application No. 102012020185.0, filed on Oct. 15, 2012, which itself is also incorporated herein by reference in its entirety.

FIELD OF THE INVENTION

The invention relates to a reamer with a workpiece-side and a drive-side axial end, a shank made of steel for mounting in a drive shaft, and circumferentially spaced-apart cutting ribs.

BACKGROUND OF THE INVENTION

Reamers made of steel should on the one hand have a long service life and on the other hand be cost-effective.

There are one-piece reamers which consist entirely of steel and have cutting ribs formed on the workpiece-side end. Moreover, these cutting ribs can also have soldered-on hard-metal cutting edges. These reamers can be reground, something which is increasingly desired by customers.

SUMMARY OF THE INVENTION

The object of the invention is to provide a reamer which can be produced cost-effectively and which allows the customer to have it reground.

This is achieved in the case of a reamer of the initially mentioned type in that a cutting body produced as a separate part and made of a harder material than the shank is provided, which cutting body forms the workpiece-side end of the reamer over the whole outer circumference of the workpiece-side end and which is fastened to the shank.

In the case of the reamer according to the invention, a plurality of strip-like cutting ribs are not fastened as separate bodies to the shank, but a cutting body is provided on which the cutting ribs are formed. This cutting body forms the workpiece-side end of the reamer on the outer circumference, and is thus a one-piece body. The production of this cutting body is overall more favorable than the production of numerous individual cutting ribs. Moreover, the customer has the major advantage when regrinding that he is only to use grinding tools which are suitable for one metal. In the case of the previous reamers, it was necessary to work with two different grinding tools, namely a grinding tool with which the hard-metal cutting ribs were ground, and a second grinding tool for the adjoining region made of steel. This second grinding tool can now be dispensed with since the cutting rib and also the adjoining region are made of the same material. The shank made of steel serves for holding the cutting body and gives the tool the necessary flexibility.

The cutting body preferably has integrally formed cutting ribs.

Moreover, the chip grooves on the cutting body can merge into chip groove run outs on the outer circumference of the shank, with the result that the chips are also guided laterally on the shank in chip grooves. However, regrinding is not absolutely necessary in this region.

The cutting body is preferably soldered on the shank.

The shank has an end face which faces the cutting body and on which the cutting body is soldered with the result that a large contact surface is obtained on the one hand and an easy manufacture of cutting body and shank is made possible on the other hand.

The end face can be completely planar, without extensions or the like. Moreover, however, it is also possible that a centering extension, for example, projects from the end face into a corresponding receptacle in the cutting body, which extension can be cylindrical or conical, for example.

The cutting body can form the workpiece-side end face of the reamer, i.e. form the whole end face.

Irrespective of the exact embodiment of the invention, the cutting body should be a separately prefabricated part which is first fabricated completely and then subsequently is fastened to the shank. Alternatively to this, however, it is also possible, after fastening the cutting body to the shank, to carry out final grinding work on the cutting body, for example to produce coaxiality between the outer circumference and the outer circumference of the shank.

Moreover, there should be provided at least one coolant passage which extends from the shank to the workpiece-side end face of the reamer and opens either there or at the outer circumference.

The shank can have a shoulder, with a larger-diameter section joining the cutting body and a smaller-diameter section to be mounted in the drive shaft.

As a result of the larger section, the shank has a larger surface on which the cutting body can bear at the end and be fastened to the shank.

The coolant passage should emanate from the end face of the shoulder, i.e. from the drive-side end face of the shoulder. Moreover, however, it is also possible to provide a further or an alternative coolant passage which emanates, for example, at the end from the section of smaller diameter and opens on the opposite, workpiece-side end face of the cutting body.

If the coolant passages have sections in the shank and in the cutting body, the shank and cutting body must be aligned circumferentially with respect to one another. This is possible, where appropriate, by means of one or more extensions acting in the circumferential direction and complimentary recesses which are formed on the shank or on the cutting body.

In order to protect the shank from wear, the cutting body can be larger in its outside diameter than the shank.

The preferred embodiment provides that the cutting body is a sintered body, with the result that the cutting ribs are formed at the same time during sintering. The materials used for the cutting body are preferably carbides or cermet.

BRIEF DESCRIPTION OF THE DRAWINGS

Further features and advantages of the invention will emerge from the description below and from the drawings to which reference is made. In the drawings.

DETAILED DESCRIPTION OF THE INVENTION

Figure 1:
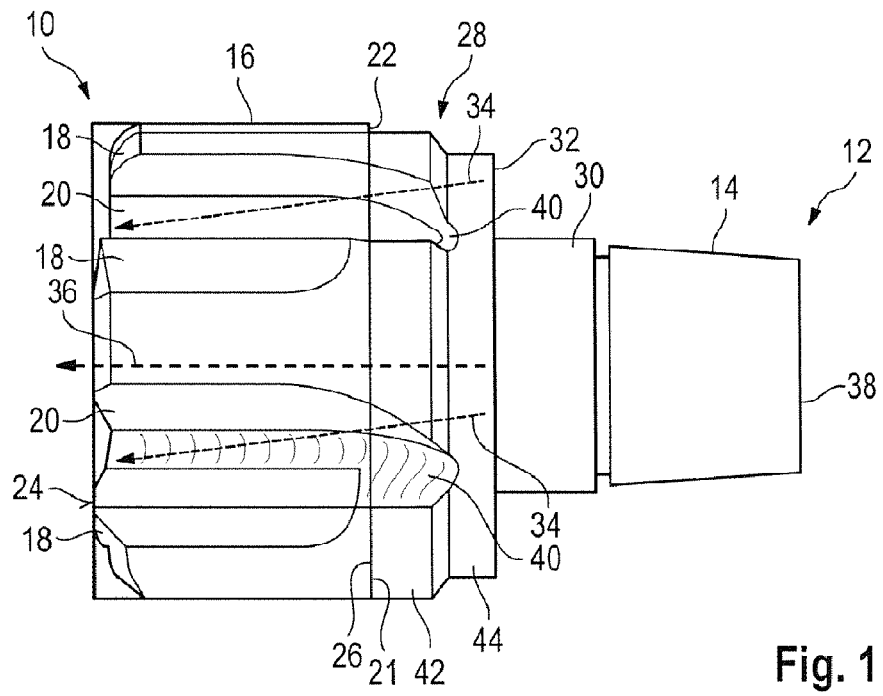
FIG. 1 shows a side view of an embodiment of the reamer according to the invention.

FIG. 1 depicts a reamer which has a workpiece-side end 10 and a drive-side end 12.

The reamer comprises two parts, preferably consists only of two parts, namely a shank 14 and a cutting body 16 fastened to the shank. The shank 14 is made of steel and forms the drive-side end 12.

The cutting body 16 preferably forms alone the workpiece-side end 10 and consists of a hard metal, preferably being a sintered body made of cermet, for example. Alternatively to this, the cutting body consists of carbide.

The cutting body, which has a substantially cylindrical shape, has cutting ribs 18 integrally formed on the outer circumference thereof. At the edge of the cutting ribs 18, chip grooves 20 are formed by depressions in the cutting body 16. The chip grooves 20 extend as far as the shank-side end 21 of the cutting body 16.

The cutting body 16 extends around in a circumferentially enclosed manner at the outer circumference of the reamer in the region of the workpiece-side end, forming, as it were, the outer circumference of the reamer in this section.

The embodiment according to FIG. 1 provides that the cutting body 16 also completely forms the workpiece-side end face 24 of the reamer.

In the embodiment according to FIG. 1, the end face 22 of the cutting bodies 16 that faces the shank 14 and is opposed to the end face 24 is planar and bears with its full surface against an opposite, planar end face 26 of the shank 14. The two end faces 22, 24 form the Single contact faces; here the cutting body 16 is connected to the shank 14, preferably by soldering.

The shank 14 has substantially two sections, namely a larger-diameter section 28 which adjoins the cutting body 16 and a smaller-diameter section 30 which extends toward the drive-side end 12 and which is inserted into the drive shaft of the drive tool. By means of the two cross-sectionally different sections 28, 30 there results a shoulder in the shank 14 with an end face 32 which faces the drive-side end 12.

From the end face 32 there can emanate one or more coolant passages 34, symbolized by arrows represented with interrupted lines, which extend through the shank and through corresponding passages in the cutting body 16 to the end face 24 and open there. Alternatively or in addition, it would also be possible for coolant passages to end on the circumferential wall of the cutting body 16.

Alternatively or in addition, a central coolant passage can also be provided which extends, for example, along the center axis of the reamer and emanates from the end 38 of the section 30.

As can be seen from FIG. 1, the cutting body 16 has a larger outside diameter than the section 28 of the shank 14, the outside diameter of the cutting body 16 being measured at the radially outermost point of the respective cutting ribs 18.

The chip grooves 20 in the cutting body 16 merge into chip groove run outs 40 in the section 28 and run out therein.

The outflow of chips can be further improved if the section 28, as shown in FIG. 1, is again subdivided into two sub sections 42, 44 provided with different diameters, wherein the smaller-diameter sub section 44 lies closer to the drive-side end 12, with the result that the chip groove run outs 40 open in the sub section 44, i.e. a groove is no longer present there, and the chips are no longer guided in grooves in this region but can "flow out" freely.

The embodiment according to FIG. 2 corresponds substantially to that in FIG. 1, and therefore only the differences will be discussed below, and the parts, surfaces or sections already introduced up to this point will also retain their reference signs in FIG. 2.

Figure 2:
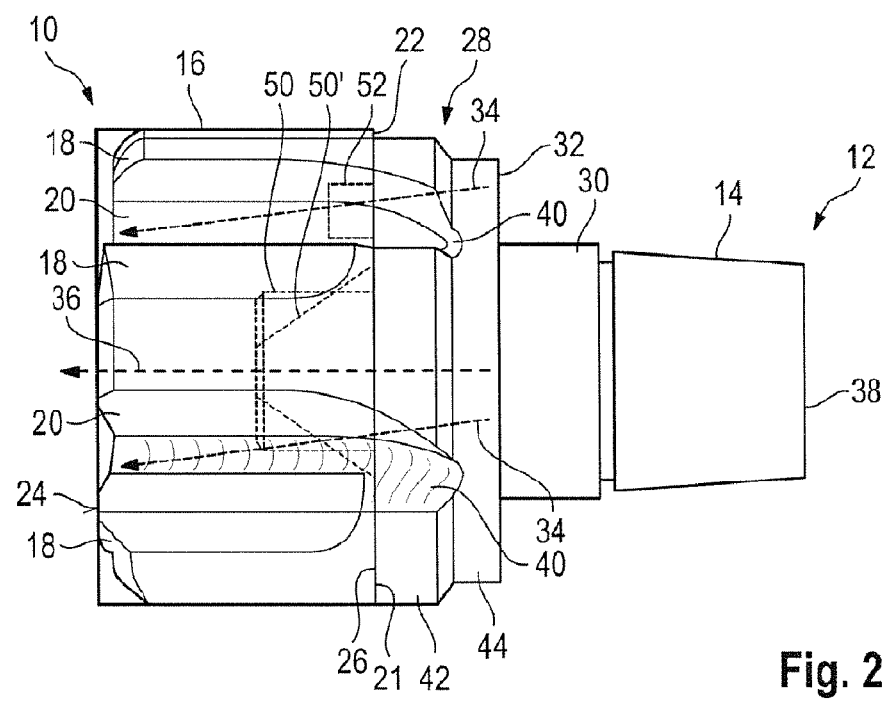
FIG. 2 shows a side view of the reamer according to the invention according to a second embodiment.

Whereas in the embodiment according to FIG. 1 the two end faces 22, 26 of the cutting body 16 or of the shank 14 were completely planar, in the embodiment according to FIG. 2 a centering mandrel 50 is provided on the shank 14, which mandrel projects from the end face 26 and protrudes into a complimentarily formed recess in the cutting body 16.

The centering mandrel 50 can extend partially into the interior of the cutting body 16, i.e. not extend as far as the end face 24 and form a part thereof. In this embodiment, the cutting body 16 will then be embodied as a ring.

The centering mandrel 50 can be cylindrical or conical, as shown in each case with interrupted lines. The conical centering mandrel bears the reference sign 50'.

In order to achieve a circumferential alignment of cutting body 16 and shank 14, a positive-locking connection is additionally optionally provided in the circumferential direction between cutting body 16 and shank 14, namely, for example, by means of an eccentric extension 52 on the end face 26, which extension penetrates into a complimentary opening in the cutting body 16. This circumferential alignment can of course also be provided in the embodiment according to FIG. 1.

The cutting body 16 is preferably completely prefabricated before it is fastened to the shank 14. This means that, according to an embodiment of the invention which is not intended to be understood as limiting, the cutting ribs 18 are also already completely produced before the cutting body 16 is mounted on the shank 14.

The reamer can be readily reground, with different grinding tools not required here since the cutting ribs 18 are formed exclusively in the cutting body 16.

It is, if appropriate, also possible, after a number of grinding operations, to separate the cutting body 16 from the shank 14 and to refit a new cutting body 16 on the already used shank 14.

What is claimed is:

1. A reamer with a workpiece-side axial end and a drive-side axial end, the reamer comprising:
   a shank for mounting in a drive shaft; and
   a cutting body produced as a separate part from the shank and made of a different material than the shank;
   wherein the cutting body:
      is fastened to the shank;
      forms the workpiece-side end of the reamer over an entire outer circumference of the workpiece-side end;
      comprises cutting ribs which are spaced-apart circumferentially and are formed solely on the cutting body; and
      comprises chip grooves disposed between the cutting ribs;
   the shank comprising chip groove run outs recessed into an outer circumference of the shank;
   the chip grooves on the cutting body merging directly into the chip groove run outs on the outer circumference of the shank;
   the shank further comprising:
      a first, larger-diameter sub-section adjacent to and adjoining the cutting body; and
      a second, smaller-diameter sub-section extending axially away from the first sub-section;
      wherein the chip groove run outs extend through the first sub-section and open out in the second sub-section.

2. The reamer according to claim 1, wherein the cutting ribs are generally straight and run in a generally axial direction of the reamer.

3. The reamer according to claim 1, wherein the cutting body is made of a harder material than the shank.

4. The reamer according to claim 1, wherein the shank is made of steel.

5. The reamer according to claim 1, wherein the cutting body comprises a sintered body made of cermet or carbide.

6. The reamer according to claim 1, wherein the cutting body is fastened to the shank via soldering.

7. The reamer according to claim 6, wherein the cutting body is fastened to the shank at a single contact face between the cutting body and the shank.

8. The reamer according to claim 7, wherein the single contact face comprises an end face of the shank which faces the cutting body and on which the cutting body is soldered.

9. The reamer according to claim 8, wherein:
the cutting body comprises a drive-side end face; and
the drive-side end face of the cutting body engages the end face of the shank at the single contact face between the cutting body and the shank.

10. The reamer according to claim 9, wherein the drive-side end face of the cutting body and the end face of the shank are both completely planar.

11. The reamer according to claim 9, wherein:
the cutting body comprises an internal recess extending from the drive-side end face of the cutting body; and
the shank comprises a mandrel which extends from the end face of the shank and protrudes into the internal recess of the cutting body.

12. The reamer according to claim 1, wherein the cutting ribs are integrally formed with respect to the cutting body.

13. The reamer according to claim 1, wherein the cutting body comprises a region having the largest outside diameter of the reamer, and has a larger outside diameter than the shank.

14. The reamer according to claim 13, wherein the largest outside diameter of the reamer is measured at a radially outermost point of the cutting ribs.

15. The reamer according to claim 1, wherein the shank comprises:
a first, larger-diameter section adjacent to and adjoining the cutting body; and
a second, smaller-diameter section extending axially away from the first section;
wherein the first section comprises the first and second sub-sections;
the chip groove run-outs thereby terminating within the first section.

16. The reamer according to claim 15, wherein the shank comprises a shoulder where the first section adjoins the second section, the shoulder resulting from different diameters between the first and second sections.

17. The reamer according to claim 16, wherein:
the second sub-section of the shank extends from the first sub-section to the shoulder.

18. The reamer according to claim 16, further comprising at least one coolant passage which emanates from an end face formed by the shoulder.

19. The reamer according to claim 1, comprising a workpiece-side end face disposed on the cutting body.

20. The reamer according to claim 19, further comprising at least one coolant passage extending from the shank to the workpiece-side end face of the reamer.

21. The reamer according to claim 20, wherein the at least one coolant passage opens at the workpiece-side end face of the reamer.

22. A reamer with a workpiece-side axial end and a drive-side axial end, the reamer comprising:
a shank for mounting in a drive shaft; and
a cutting body produced as a separate part from the shank and made of a different material than the shank;
wherein the cutting body:
is fastened to the shank;
forms the workpiece-side end of the reamer over an entire outer circumference of the workpiece-side end;
comprises cutting ribs which are spaced-apart circumferentially; and
comprises chip grooves disposed between the cutting ribs;
the shank comprising:
a first, larger-diameter section adjacent to and adjoining the cutting body;
a second, smaller-diameter section extending axially away from the first section;
chip groove run outs which are recessed into an outer circumference of the shank and terminate within the first section; and
a shoulder where the first section adjoins the second section, the shoulder
resulting from different diameters between the first and second sections;
the chip grooves on the cutting body merging directly into the chip groove run outs on the outer circumference of the shank;
the first section of the shank comprising:
a first, larger-diameter sub-section adjacent to and adjoining the cutting body; and
a second, smaller-diameter sub-section extending axially away from the first sub-section;
wherein the chip groove run outs extend through the first sub-section and open out in the second sub-section.

* * * * *